United States Patent
Yaron et al.

(10) Patent No.: US 12,554,836 B2
(45) Date of Patent: Feb. 17, 2026

(54) SYSTEMS AND METHODS FOR CONTEXTUAL ALERT ENRICHMENT IN COMPUTING INFRASTRUCTURE AND REMEDIATION THEREOF

(71) Applicant: Wiz, Inc., New York, NY (US)

(72) Inventors: Eshel Yaron, Amsterdam (NL); Tomer Schwartz, Tel Aviv (IL); Rom Gendler, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/923,095

(22) Filed: Oct. 22, 2024

(65) Prior Publication Data

US 2025/0045379 A1   Feb. 6, 2025

Related U.S. Application Data

(63) Continuation of application No. 18/048,630, filed on Oct. 21, 2022.

(51) Int. Cl.
  *G06F 21/54*   (2013.01)

(52) U.S. Cl.
  CPC ........ *G06F 21/54* (2013.01); *G06F 2221/033* (2013.01)

(58) Field of Classification Search
  None
  See application file for complete search history.

(56) References Cited

U.S. PATENT DOCUMENTS

| | | | | |
|---|---|---|---|---|
| 5,930,503 A | * | 7/1999 | Drees | G06F 9/445 713/1 |
| 8,615,015 B1 | * | 12/2013 | Shekhar | H04L 45/54 370/408 |
| 8,646,020 B2 | | 2/2014 | Reisman | |

(Continued)

FOREIGN PATENT DOCUMENTS

| | | | | |
|---|---|---|---|---|
| CN | 109947537 A | | 6/2019 | |
| WO | WO2007041242 A2 | * | 4/2007 | G06F 9/44 |

OTHER PUBLICATIONS

International Search Report for PCT/IB2023/060134, dated Dec. 28, 2023. Searching Authority Israel Patent Office, Jerusalem, Israel.

(Continued)

*Primary Examiner* — Paul R Fisher
(74) *Attorney, Agent, or Firm* — M&B IP Analysts, LLC

(57) ABSTRACT

A system and method for securing deployment of computing infrastructure resources. A method includes determining, based on a unique identifier of a computing infrastructure resource indicated in an alert, a source identifier of a resource component including the computing infrastructure resource, wherein the resource component includes at least one source file, wherein the source identifier of the resource component is a combination of characteristics of the resource component which collectively uniquely identify the resource component with respect to the directory in which the at least one source file of the resource component reside; contextually enriching the alert by adding the source identifier of the resource component including the computing infrastructure resource to the alert; and performing at least one remediation action with respect to the contextually enriching alert.

19 Claims, 5 Drawing Sheets

(56) References Cited

U.S. PATENT DOCUMENTS

| | | | |
|---|---|---|---|
| 9,703,550 B1* | 7/2017 | McCann | G06F 9/44505 |
| 10,255,370 B2 | 4/2019 | Carpenter et al. | |
| 10,423,410 B1* | 9/2019 | Goyal | G06N 3/08 |
| 10,474,438 B2 | 11/2019 | Bijani et al. | |
| 10,671,368 B2 | 6/2020 | Brealey et al. | |
| 10,732,962 B1* | 8/2020 | Florescu | G06F 11/0706 |
| 10,791,021 B1 | 9/2020 | Sharma | |
| 10,872,029 B1 | 12/2020 | Bawcom | |
| 10,884,732 B1 | 1/2021 | Zolotow et al. | |
| 10,999,163 B2 | 5/2021 | Abraham | |
| 11,327,723 B1* | 5/2022 | Gersht | G06F 11/323 |
| 12,355,626 B1* | 7/2025 | Varakantam | G06F 9/455 |
| 2003/0154212 A1 | 8/2003 | Schirmer et al. | |
| 2008/0086718 A1* | 4/2008 | Bostick | G06F 8/71 717/120 |
| 2014/0108665 A1 | 4/2014 | Arora et al. | |
| 2016/0034273 A1* | 2/2016 | Leupold | G06F 8/71 717/122 |
| 2018/0123876 A1 | 5/2018 | Tang et al. | |
| 2018/0196867 A1 | 7/2018 | Wiesmaier et al. | |
| 2018/0302272 A1 | 10/2018 | Makovsky | |
| 2020/0012480 A1 | 1/2020 | Rizo et al. | |
| 2020/0293502 A1 | 9/2020 | Tal et al. | |
| 2020/0387357 A1 | 12/2020 | Mathon et al. | |
| 2022/0083520 A1 | 3/2022 | Malamut et al. | |
| 2022/0222354 A1 | 7/2022 | Agarwwal | |
| 2022/0318002 A1 | 10/2022 | Copty et al. | |
| 2023/0009127 A1 | 1/2023 | Boyer | |
| 2023/0022079 A1 | 1/2023 | Vrudhula et al. | |
| 2023/0161871 A1 | 5/2023 | Heller et al. | |
| 2023/0246902 A1* | 8/2023 | Shen | H04L 41/0631 714/37 |

OTHER PUBLICATIONS

Salonen, Esko. "Software Project Services using Infrastructure-as-Code." (2020). (Year: 2020).

Written Opinion of the Searching Authority for PCT/IB2023/060134, dated Dec. 28, 2023. Searching Authority Israel Patent Office, Jerusalem, Israel.

First Office Action for CN application No. 202380084567.9, dated Aug. 22, 2025. China National Intellectual Property Administration, Beijing, China.

Pereira, Rui Manuel Ribeiro. "Cloud provider independence using DevOps methodologies with Infrastructure-as-Cide." (2021). (Year: 2021).

* cited by examiner

SYSTEMS AND METHODS FOR CONTEXTUAL ALERT ENRICHMENT IN COMPUTING INFRASTRUCTURE AND REMEDIATION THEREOF

CROSS-REFERENCE TO RELATED APPLICATIONS

This application is a continuation of U.S. patent application Ser. No. 18/048,630 filed on Oct. 21, 2022, now pending, the contents of which are hereby incorporated by reference.

TECHNICAL FIELD

The present disclosure relates generally to cybersecurity for computing environments, and more specifically to securing computing environments by enriching alerts using applicable information about computing infrastructure resources involved in the alerts.

BACKGROUND

Infrastructure as code (IaC) is a management technique of computing infrastructure in a high-level descriptive model. IaC allows for automating the provisioning of information technology (IT) infrastructure without requiring developers or infrastructure engineers to manually provision and manage servers, operating systems, database connections, storages, and other infrastructure elements when developing, testing, and deploying software applications. The goal of IaC is generally to provision cloud resources from code.

In IaC, an infrastructure may include various computing infrastructure resources such as network adapters, applications, containers, and the like, each of which can be implemented as code. An IaC file is interpreted or executed in order to provision these computing infrastructure resources within a cloud environment.

A key aspect of managing infrastructure is securing the infrastructure against potential cyber threats. To this end, most virtualized execution environments deploy several cybersecurity detection tools to monitor for abnormalities in different parts of the software development pipeline such as code, container repositories, production containers, and the like. These tools may generate alerts when abnormal or otherwise potentially vulnerable code or configuration is detected. In many implementations, the different tools scan for alerts in different parts of the pipeline. An alert is a collection of events that, taken together, are significant from a cybersecurity perspective. Each alert may be realized as or may include text indicating the type of potential risk, the events involved, relevant times, and the like.

In various IaC techniques, a set of interrelated modules containing resource definitions that collectively represent a desired state of a computing environment are maintained. Each module may include a set of source files. For example, Terraform, a common IaC language and framework, uses Terraform applications which are initiated by execution of the "terraform apply" command with respect to a certain Terraform module. This is also referred to as applying that module. Terraform applications often take place as part of an organization's code-to-cloud pipeline, typically in an automatic and periodic manner. When a Terraform application creates or otherwise manages a cloud resource, it records an association between a language-specific identifier (e.g., a Terraform identifier) of the resource and a globally unique identifier (GUID) of the resource in a configuration mapping file such as a state file.

Each Terraform module defines a set of Terraform resources. Terraform modules may depend on each other in order to incorporate Terraform resource definitions from other Terraform modules. For some IaC languages like Terraform, a unique identifier such as a GUID is not maintained for each cloud resource (e.g., each Terraform resource) which may be utilized by modules applied using the respective IaC techniques and code.

A first Terraform module M may depend from a second Terraform module N, and the second Terraform module N may in turn depend on a third Terraform module T. In such a case, it can be said that T is a transitive dependency of M. In other words, it can be said that M indirectly depends on T (i.e., through its dependency on N which in turn depends on T). When Terraform module M is applied, the Terraform code is tasked with synchronizing the state of all resources defined by module M along with all of the resources defined by the modules N and T on which module M depends. This synchronization may include creating, deleting, and modifying resources.

A root module is a module which is applied directly, i.e., not only as a dependency of another module. Organizations often maintain several root modules as well as many non-root modules, where each non-root module only acts as a dependency for other modules and is not deployed directly.

In other IaC implementations, information identifying cloud-based resources may be stored differently. For example, in Azure Resource Manager (ARM) implementations, a cloud-based resource identifier may be stored directly in a source file rather than using a configuration mapping file to maintain associations between GUIDs and cloud-based resource identifiers as might be performed for Terraform.

Techniques that improve automated alerting and remediation are highly desirable for protecting computing infrastructure against cyber threats.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for remediating contextually enriched alerts in infrastructure as code (IaC) deployments. The method comprises: determining, based on a unique identifier of a computing infrastructure resource indicated in an alert, a source identifier of a resource component including the computing infrastructure resource, wherein the resource component includes at least one source file, wherein the source identifier of the resource component is a combination of characteristics of the resource component which collectively uniquely identify the resource component with respect to the directory in which the at least one source file of the resource component reside; contextually enriching the alert by adding the source identifier of the resource component including the computing infrastructure resource to the alert; and performing at least one remediation action with respect to the contextually enriching alert.

Certain embodiments disclosed herein also include a non-transitory computer readable medium having stored thereon causing a processing circuitry to execute a process, the process comprising: determining, based on a unique identifier of a computing infrastructure resource indicated in an alert, a source identifier of a resource component including the computing infrastructure resource, wherein the resource component includes at least one source file, wherein the source identifier of the resource component is a combination of characteristics of the resource component which collectively uniquely identify the resource component with respect to the directory in which the at least one source file of the resource component reside; contextually enriching the alert by adding the source identifier of the resource component including the computing infrastructure resource to the alert; and performing at least one remediation action with respect to the contextually enriching alert.

Certain embodiments disclosed herein also include a system for remediating contextually enriched alerts in infrastructure as code (IaC) deployments. The system comprises: a processing circuitry; and a memory, the memory containing instructions that, when executed by the processing circuitry, configure the system to: determine, based on a unique identifier of a computing infrastructure resource indicated in an alert, a source identifier of a resource component including the computing infrastructure resource, wherein the resource component includes at least one source file, wherein the source identifier of the resource component is a combination of characteristics of the resource component which collectively uniquely identify the resource component with respect to the directory in which the at least one source file of the resource component reside; contextually enrich the alert by adding the source identifier of the resource component including the computing infrastructure resource to the alert; and perform at least one remediation action with respect to the contextually enriching alert.

Certain embodiments disclosed herein include a method for remediation. The method comprises: identifying a plurality of steps in at least one software development pipeline log, wherein each of the identified plurality of steps is a step in which a first resource component among a plurality of first resource components is deployed; analyzing the at least one software development pipeline log with respect to the identified plurality of steps in order to determine a location and a time of deployment for each first resource component of the plurality of first resource components; retrieving source code of a root resource component for each first resource component of the plurality of first resource components based on the determined location and time of deployment for the first resource component; creating an enrichment database by analyzing the source code of each root resource component in order to identify a plurality of dependencies of each root resource component, wherein the enrichment database includes associations between source identifiers of the plurality of first resource components and unique identifiers of a plurality of resources indicated in a plurality of respective resource definitions in the plurality of first resource components; determining a source identifier of a second resource component including a computing infrastructure resource by querying the enrichment database using the unique identifier of the computing infrastructure resource, wherein the second resource component is indicated in an alert; and performing at least one remediation action with respect to the alert based on the source identifier of the second resource component.

Certain embodiments disclosed herein also include a non-transitory computer-readable medium having stored thereon causing a processing circuitry to execute a process, the process comprising: identifying a plurality of steps in at least one software development pipeline log, wherein each of the identified plurality of steps is a step in which a first resource component among a plurality of first resource components is deployed; analyzing the at least one software development pipeline log with respect to the identified plurality of steps in order to determine a location and a time of deployment for each first resource component of the plurality of first resource components; retrieving source code of a root resource component for each first resource component of the plurality of first resource components based on the determined location and time of deployment for the first resource component; creating an enrichment database by analyzing the source code of each root resource component in order to identify a plurality of dependencies of each root resource component, wherein the enrichment database includes associations between source identifiers of the plurality of first resource components and unique identifiers of a plurality of resources indicated in a plurality of respective resource definitions in the plurality of first resource components; determining a source identifier of a second resource component including a computing infrastructure resource by querying the enrichment database using the unique identifier of the computing infrastructure resource, wherein the second resource component is indicated in an alert; and performing at least one remediation action with respect to the alert based on the source identifier of the second resource component.

Certain embodiments disclosed herein also include a system for remediation. The system comprises: a processing circuitry; and a memory, the memory containing instructions that, when executed by the processing circuitry, configure the system to: identify a plurality of steps in at least one software development pipeline log, wherein each of the identified plurality of steps is a step in which a first resource component among a plurality of first resource components is deployed; analyzing the at least one software development pipeline log with respect to the identified plurality of steps in order to determine a location and a time of deployment for each first resource component of the plurality of first resource components; retrieve source code of a root resource component for each first resource component of the plurality of first resource components based on the determined location and time of deployment for the first resource component; create an enrichment database by analyzing the source code of each root resource component in order to identify a plurality of dependencies of each root resource component, wherein the enrichment database includes associations between source identifiers of the plurality of first resource components and unique identifiers of a plurality of resources indicated in a plurality of respective resource definitions in the plurality of first resource components; determine a source identifier of a second resource component including a computing infrastructure resource by querying the enrichment database using the unique identifier of the computing infrastructure resource, wherein the second resource component is indicated in an alert; and perform at least one remediation action with respect to the alert based on the source identifier of the second resource component.

Certain embodiments disclosed herein include a method, non-transitory computer-readable medium, or system as noted above or below, wherein the second resource component includes at least one source file, wherein the source identifier of the resource component is a combination of characteristics of the resource component which collectively uniquely identify the resource component with respect to the directory in which the at least one source file of the resource component reside.

Certain embodiments disclosed herein include a method, non-transitory computer-readable medium, or system as noted above or below, further including or being configured to perform the following step or steps: contextually enriching the alert indicating the second resource component by adding the source identifier of the second resource component to the alert in order to create a contextually enriched alert.

Certain embodiments disclosed herein include a method, non-transitory computer-readable medium, or system as noted above or below, wherein the at least one remediation action is performed based on the contextually enriched alert.

Certain embodiments disclosed herein include a method, non-transitory computer-readable medium, or system as noted above or below, further including or being configured to perform the following step or steps: determining a software development pipeline run which triggered the alert; and determining an author of the software development pipeline run which triggered the alert, wherein the alert is contextually enriched based further on the determined author.

Certain embodiments disclosed herein include a method, non-transitory computer-readable medium, or system as noted above or below, wherein the combination of characteristics of the source identifier of the resource component includes a repository in which the at least one source file of the resource component reside, a revision of the repository, and a path to the directory of the resource component.

Certain embodiments disclosed herein include a method, non-transitory computer-readable medium, or system as noted above or below, further including or being configured to perform the following step or steps: recursively crawling through source code of the root resource component and at least one dependency of the root resource component, wherein the source identifiers of the plurality of resource components are determined based on the recursive crawling.

Certain embodiments disclosed herein include a method, non-transitory computer-readable medium, or system as noted above or below, wherein the recursive crawling is performed up to at least one leaf resource component among the plurality of first resource components, wherein each leaf resource component is a resource component from which another resource component depends, wherein each leaf resource component does not depend from another resource component.

Certain embodiments disclosed herein include a method, non-transitory computer-readable medium, or system as noted above or below, wherein the enrichment database is created based on a configuration mapping file of at least one root resource component and based on source code of the at least one root resource component.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
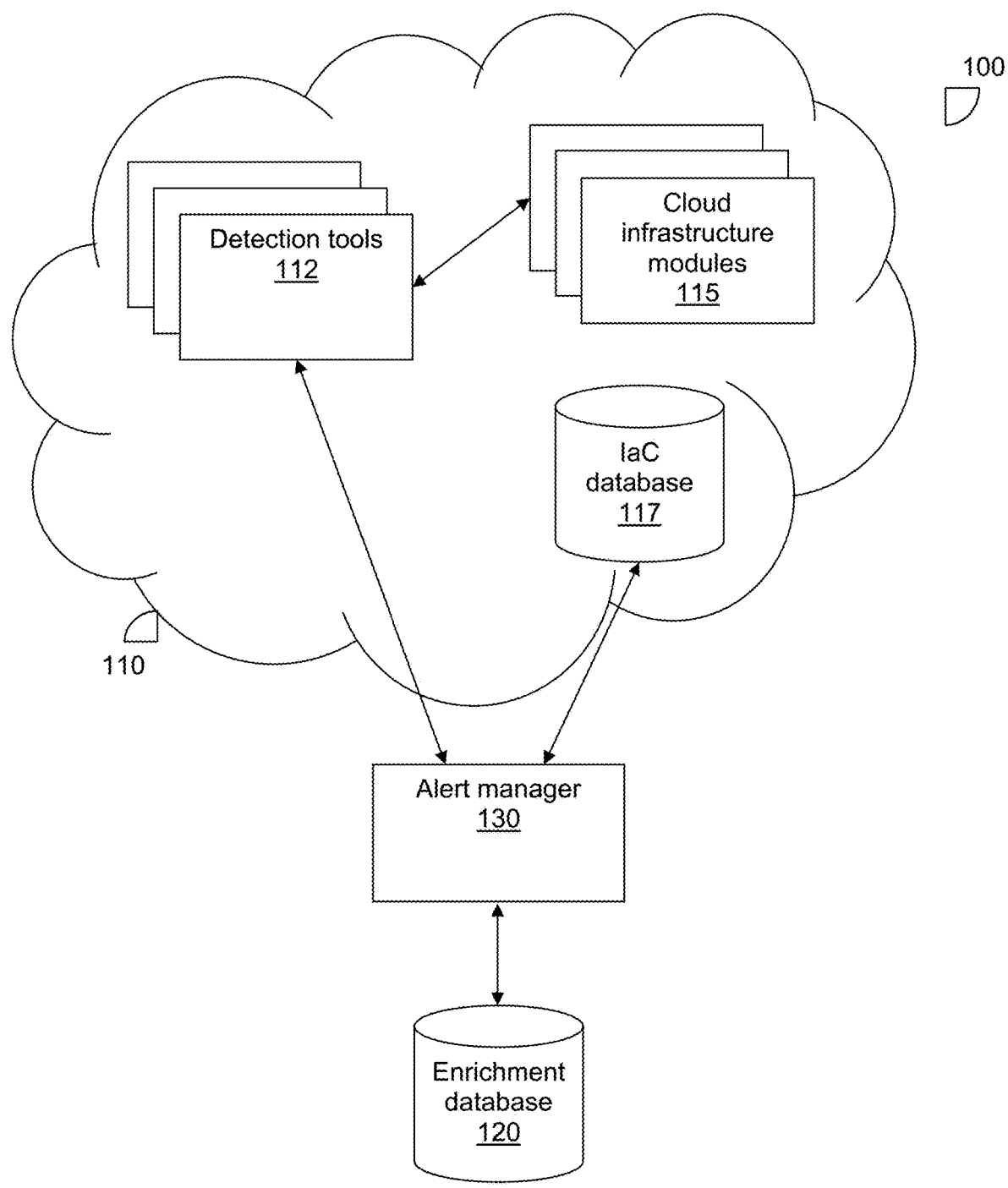
FIG. 1 is a network diagram utilized to describe various disclosed embodiments.

The various disclosed embodiments include methods and systems for contextually enriching and remediating alerts or otherwise enriching resource-identifying data including identifiers of computing infrastructure resources. The disclosed embodiments may be utilized to provide additional context to alerts or other resource-identifying data generated with respect to computing infrastructure resources deployed using infrastructure as code (IaC) techniques and, more specifically, by providing context related to computing infrastructure resource components such as modules including definitions of computing infrastructure resources that are involved in events that triggered alerts. The additional context provided by the enrichment allows for improving automated and manual remediation of alerts by more accurately identifying the resources involved in an alert as well as the appropriate remediation steps to avoid cyber threats.

More specifically, in accordance with various disclosed embodiments, alerts or other resource-identifying data are contextually enriched using information related to computing infrastructure resource components. The computing infrastructure resource components, hereinafter referred to as resource components, include definitions of computing infrastructure resources identified in the resource-identifying data such as, but not limited to, IaC definitions of modules, authors of the IaC definitions, both, and the like. To this end, various disclosed embodiments provide techniques for correlating resources (e.g., resources whose definitions are included among such resource components) to respective IaC definitions by associating unique identifiers (e.g., globally unique identifiers, or GUIDs) of resources whose definitions are included in those resource components with IaC-specific source identifiers of those resource components or otherwise contextually enriching resource-identifying data with more information about the relevant resources which may be needed to effectively leverage that resource-identifying data.

In an embodiment, each source identifier is expressed with respect to a combination of IaC characteristics. In this regard, it is noted that, although some tools for building computing environments using IaC languages (e.g., Terraform) do not provide constant names or identifiers for relevant resources or groups of resources (e.g. Terraform modules), a given resource can still be uniquely identified as a combination of such IaC characteristics. Thus, various disclosed embodiments collectively utilize combinations of IaC characteristics as source identifiers of resource components, thereby allowing for accurately identifying the resource components and, consequently, the particular computing infrastructure resources involved in any given alert or indicated in resource-identifying data.

More specifically, it has been identified that, in at least some implementations, these resource components can be uniquely identified with respect to the directory in which its source files reside. As a non-limiting example, this may be possible when the IaC language used is Terraform. To this end, in some embodiments, each computing infrastructure resource component (e.g., each module) is uniquely identified via a combination of the following characteristics: a repository in which the source files of the component are maintained, a specific revision of that repository, and a path to a directory of the component inside the repository at that revision. For a given resource component (e.g., a certain Terraform module), these 3 characteristics may collectively define a source location which uniquely identifies the resource component. The repository is a file storage location such as, but not limited to, a central file storage. In accordance with various disclosed embodiments, the repository is a storage location where source files are stored.

Further, various disclosed embodiments utilize analysis of both configuration mapping files (e.g., state files) s and source code in order to further improve the derivation of such associations and, consequently, alert enrichment using the associations as well as remediation of the enriched alerts. In this regard, it has been identified that source code, which is developed by engineers acting as authors, provides some information that is useful for uniquely identifying resource components such as modules, but use of source code alone presents certain challenges. In particular, because the source code is coded by human authors, identifications of resource components often vary due to differences in formatting, typos, mistaken identification of resources, and the like. It has been identified that using source code in combination with artifacts that are not developed by the engineers/authors (e.g., configuration mapping files) allows for adding context which can be used to confirm the accuracy of the identification of computing infrastructure resource components in the source code, which in turn allows for more accurately identifying a given resource component.

In accordance with various disclosed embodiments, a computing environment is contextually analyzed in order to obtain data to be used for alert enrichment including associations between unique identifiers of resources and source identifiers of resource components deployed in the computing environment as well as data related to deployment of the resource components. The contextual analysis may be performed repeatedly (e.g., periodically) in order to continue developing insights into the computing environment as more resource components are deployed. To this end, the contextual analysis may further include noting times of deployment of resource components as well as times of pipeline runs in which resource components are deployed. Incoming alerts are consumed and analyzed with respect to the contextual analysis in order to determine applicable enrichment data, and the alerts are enriched using their determined enrichment data. The enriched alerts may be remediated.

In an embodiment, software development pipeline logs are fetched and analyzed in order to identify steps where resource components are deployed as part of an IaC deployment. Logs indicating such deployment steps are further analyzed in order to determine the location of the resource component deployed during each identified step and a time of deployment of the resource component. In various embodiments, the location and time of deployment of each deployed resource component may be stored in an enrichment database containing data used for contextually enriching alerts. In another embodiment, a computing infrastructure configuration may be analyzed instead of or in addition to fetching and analyzing the logs. In this regard, it is noted that logs are sometimes stored only temporarily such that the logs may not be available in some circumstances.

A relevant revision of a root resource component (e.g., a root module) is retrieved for each deployed resource component and parsed in order to obtain source code of the root resource component. Each root resource component is a collection of computing infrastructure resources deployed in a computing environment which are defined in files of a main working directory of the computing environment. The root resource component for each deployed resource component is a root resource component which called one or more resources of the deployed resource component. The relevant revision of such a root resource component may be the revision used during the latest pipeline run which included deployment of the respective deployed resource component. The source code of each root resource component is analyzed in order to determine dependencies of the root resource component and a location of a configuration mapping file associated with the root resource component. The configuration mapping file of the root resource component is retrieved from the determined location.

The source code of the dependencies of the root resource component is obtained. The source code may be obtained through a recursive analysis in which source code from one dependency is obtained and used to retrieve source code of another dependency, and this process is recursively iterated depending on the number of dependencies in each dependency chain. The recursive analysis may involve crawling through dependencies in this manner until source code is obtained for the second-to-last dependency in any given dependency chain is obtained. Using the obtained dependencies source code, associations between source identifiers of resource components and unique identifiers (e.g., globally unique identifiers, or GUIDs) of corresponding resources included in respective resource components are extracted. These associations may be stored in the enrichment database and utilized to enrich alerts.

In an embodiment, when an alert is received, the alert may be analyzed to identify a unique identifier of an affected resource indicated in the alert. The enrichment database is checked in order to determine if a resource component of the computing environment including a resource corresponding to the unique identifier can be identified. If so, the enrichment database is queried in order to determine which IaC pipeline run resulted in the issue represented in the alert. A source identifier of the resource component including the resource that is associated with the unique identifier is obtained from the enrichment database.

Source code of the resource component is retrieved based on the source identifier of the resource component and, in particular, a location of the directory in which the resource component's resource definitions are stored included as part of the source identifier. Logs related to the computing infrastructure resource may be analyzed to determine an author of a revision of the source code of the computing infrastructure resource used during a latest pipeline run that had occurred as of generation of the alert. Associations between alerts (e.g., alerts associated based on common computing infrastructure resources), source code for the computing infrastructure resource, authors of the source code for the latest revision, and an indication of the pipeline run that included deployment of the computing infrastructure resource, or a combination thereof, are utilized to enrich the alert and may optionally be stored in the enrichment database for subsequent use.

FIG. 1 shows an example network diagram 100 utilized to describe the various disclosed embodiments. The example network diagram 100 illustrates a cloud computing platform 110, an enrichment database 120, and an alert manager 130. The cloud computing platform 110 may be realized via one or more networks such as, but not limited to, a wireless, cellular or wired network, a local area network (LAN), a wide area network (WAN), a metro area network (MAN), the Internet, the worldwide web (WWW), similar networks, and any combination thereof.

The cloud computing platform 110 includes detection tools 112, one or more cloud infrastructure resource components 115 (also referred to as infrastructure-as-code resource components, or IaC resource components), and an infrastructure as code (IaC) database 117. The detection tools 112 are configured to monitor activity occurring in different parts of the software development pipeline realized in the cloud computing environment 110. As a non-limiting example, one or more tools 112 may be configured to monitor activity related to each of the code, build, deploy, stage, and production portions of the software development pipeline. Each of the detection tools 112 is configured to identify events occurring in the cloud computing environment 110 which may be relevant to cybersecurity or otherwise related to deployment and to bundle events into alerts, where each alert includes a group of events that are collectively significant for cybersecurity purposes. Each alert indicates software entities (including, but not limited to, computing infrastructure resources) involved in its group of events affecting resources such as software containers, storage buckets, computing instances, and the like. The detection tools 112 may be third party detection tools.

Each of the cloud infrastructure resource components 115 is a computing infrastructure resource component including a set of computing infrastructure resource definitions, i.e., definitions of respective computing infrastructure resources (not shown). The computing infrastructure resources are realized as code and may include, but are not limited to, network adapters, software applications, containers, virtual machines, repositories, databases, combinations thereof, and the like. The infrastructure-as-code resource components 115 include one or more root resource components (not separately depicted), where each root resource component is a resource component which is at least sometimes applied directly rather than only being applied as a dependency of another resource component. Each root resource component among the IaC resource components 115 may depend, either directly or indirectly, from one or more other resource components among the IaC resource components 115 in order to access the computing infrastructure resources of its respective dependencies.

The IaC database 117 stores pipeline logs, revisions of root resource components, source code, and other data used for or otherwise related to the deployment of the cloud infrastructure resources in the cloud computing platform 110. In some implementations, alerts generated by the detection tools 112 may also be stored in the IaC database 117. It should be noted that a single IaC database 117 is depicted in FIG. 1 merely for simplicity purposes, but that the IaC database 117 may be realized as multiple databases and/or other sources of data without departing from the scope of the disclosure.

The alert manager 130 is configured to receive alerts and other data related to the resources of the resource components 115 from the detection tools 112, to contextually enrich alerts, and to store the contextually enriched alerts in the enrichment database 120. In accordance with various disclosed embodiments, enriching the alerts further includes correlating the cloud infrastructure resource components 115 to respective IaC definitions using data stored in the IaC database 117 (e.g., pipeline logs, revisions of root resource components, source code, etc.) as described herein.

The enrichment database 120 may store enriched alerts, data used for alert enrichment, or both. The data used for alert enrichment may include, but is not limited to, associations between alerts (e.g., alerts associated based on common modules), source code for each resource component 115, authors of the source code for the latest revision, and an indication of the pipeline run that included deployment of the resource component, combinations thereof, and the like.

It should be noted that the example network diagram depicted in FIG. 1 illustrates a particular arrangement of communicating components merely for simplicity purposes, but that the disclosed embodiments are equally applicable to different cloud computing configurations. As a non-limiting example, the knowledge base 120, the alert manager 130, or both, may be deployed in the cloud computing platform 110 without departing from the scope of the disclosure. Additionally, the computing infrastructure resource components 115 may be deployed in an infrastructure other than a cloud computing infrastructure such as, but not limited to, an on-premises infrastructure. As another non-limiting example, the IaC processors 112 may be deployed outside of the cloud computing platform 110 and configured to upload computing infrastructure resources to the cloud computing platform 110.

Figure 2:
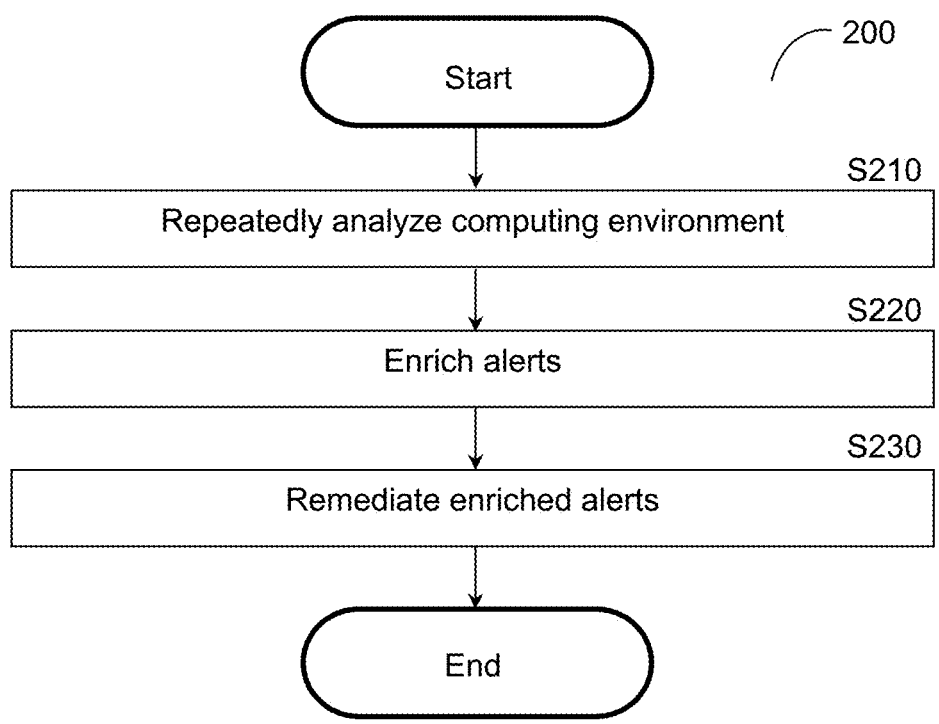
FIG. 2 is a flowchart illustrating a method for remediating contextually enriched alerts according to an embodiment.

FIG. 2 is a flowchart 200 illustrating a method for remediating contextually enriched alerts according to an embodiment. In an embodiment, the method is performed by the alert manager 130, FIG. 1.

At S210, a computing environment is analyzed in order to obtain contextual data to be used for enrichment. In particular, the computing environment is analyzed at least to derive associations between unique identifiers of resources and source identifiers of resource components as discussed herein, where each resource component is a set of resource definitions of respective computing infrastructure resources such that the unique identifier of a resource included in a given resource component is therefore associated with the source identifier of the resource component.

Figure 3:
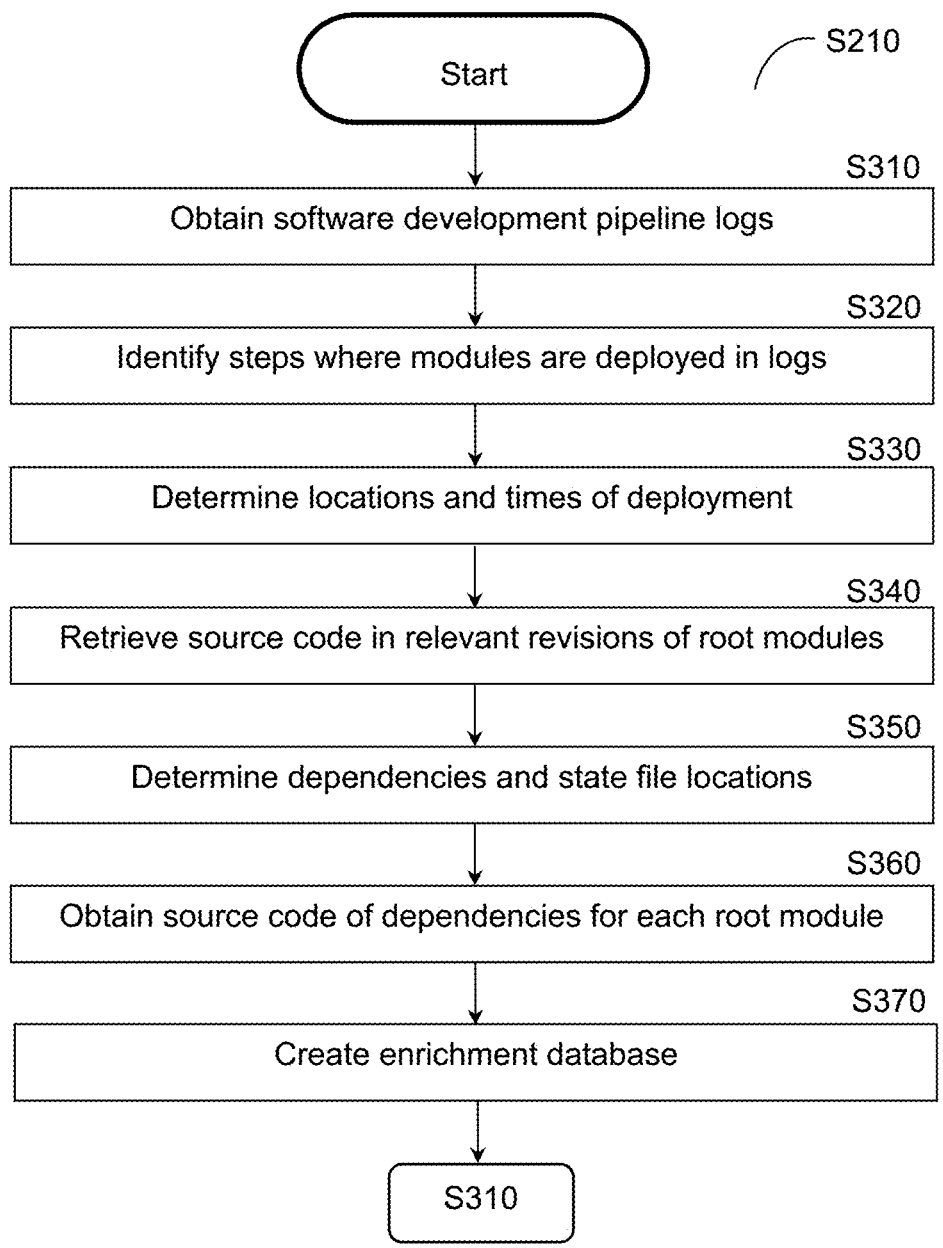
FIG. 3 is a flowchart illustrating a method for contextually analyzing a computing environment according to an embodiment.

In an embodiment, the computing environment is analyzed as now described with respect to FIG. 3. FIG. 3. is an example flowchart S210 illustrating a method for contextually analyzing a computing environment according to an embodiment.

At S310, software development pipeline logs related to deployment of IaC resource components (also referred to herein as resource components) are obtained. The logs at least indicate instances where deployments of resource components occur. In an embodiment, S310 may further include integrating with an IaC-related service such as a continuous integration/continuous development (CI/CD) service and accessing the pipeline logs via the integrated IaC service.

Each resource component is realized as a set of computing infrastructure resource definitions (also referred to herein as resource definitions), where each resource definition is or includes a set of instructions utilized to implement infrastructure as code (IaC) techniques within the computing environment. Non-limiting example computing infrastructure resource definitions include definitions of network interfaces, software applications, virtual machines, software containers, network adapters, databases, and the like. As a non-limiting example, a resource component may be a Terraform module including a set of resource definitions of resources used by Terraform.

In various IaC techniques, a set of interrelated resource components containing resource definitions that collectively represent a desired state of a computing environment are maintained. Each resource component may include a set of source files. A root resource component is one of these resource components which is defined using files stored in a main working directory of the computing environment. It has been identified that these resource components often lack constant names or identifiers used for IaC purposes, i.e., they lack individual values which uniquely identify themselves which are represented in certain IaC languages (e.g. Terraform). However, these resource components have certain characteristics which are collectively unique to a given resource component such that these resource components can be uniquely identified using combinations of their characteristics even when no constant name or identifier is used by the applicable IaC language.

At S320, steps in which resource components are deployed are identified within the obtained logs. In an embodiment, S320 includes analyzing the obtained logs in order to identify steps including instances where resource components are deployed as part of an IaC deployment. As noted above, the logs indicate when resource components are deployed.

At S330, each log including one or more of the identified steps is further analyzed in order to determine a location and a time of deployment of each deployed resource component. In a further embodiment, S330 also includes analyzing the log to determine a set of unique identifiers of resources affected by the deployment of each resource components (e.g., resources deployed or modified as part of each deployment). In some embodiments, S330 further includes storing the identified locations and times of deployment, the determined sets of unique identifiers, or both, in an enrichment database (e.g., the enrichment database 120, FIG. 1).

At S340, source code of a relevant revision of a root resource component for each deployed resource component is retrieved from the determined location of the respective resource component. In an embodiment, the relevant revision of the root resource component for a given deployed resource component is the revision used during the latest pipeline run that had occurred as of the time of deployment of the deployed resource component.

At S350, dependencies of each root resource component are determined using a configuration mapping file of the root resource component. To this end, in an embodiment, S350 includes determining a location of each root resource component's configuration mapping file and retrieving each root resource component's configuration mapping file. The configuration mapping file includes the full path for a root resource component including all dependencies thereof. The configuration mapping file may be, but is not limited to, a state file (e.g., for Terraform) which also includes a list of associations between GUIDs and cloud-based identifiers.

At S360, source code of the dependencies of each root module are obtained. In an embodiment, the dependencies include both direct dependencies and indirect (i.e., transitive) dependencies. In an embodiment, S360 includes analyzing the source code of the root module, the source code for one or more dependencies of the root module, or both, in order to identify a location of each dependency of the root module.

In an embodiment, S360 includes recursively crawling through dependencies in order to identify locations of transitive (i.e., indirect) dependencies of the root module and to retrieve the source code of those transitive dependencies. At each recursion, source code of a module is analyzed to determine the identities of any modules which the current module depends from. In a further embodiment, the recursion stops before analyzing source code of leaf modules, where each leaf module is a module on which another module depends but which does not itself depend on another module.

In this regard, it has been identified that, in order to obtain source code of all dependencies of a given root module when at least some of the dependencies of the root module are transitive (i.e., dependencies which depend from other modules), dependencies can be crawled in order to find more information about each dependency's dependencies. However, it may not be necessary to crawl through all of the dependencies in order to obtain all of the desired source code. In particular, it is noted that the source code of each module typically includes data indicating the identities of the modules it depends from. Thus, all of the data needed to create source identifiers for the leaf modules can be found by analyzing the source code module which depends from each leaf module. Accordingly, in an embodiment, the recursive crawling includes analyzing source code of the root module and all dependencies of the root module up to (but not including) the leaf modules, i.e., excluding the source code of the leaf modules.

It is further noted that the configuration mapping file of a root module typically includes data indicating how many links there are in a given chain of dependencies starting at the root module and ending at the leaf modules. In other words, the configuration mapping file includes data indicating the full path of dependencies starting at that root module. This information can be used to determine when to stop recursively crawling dependencies so as to avoid attempting to analyze the leaf nodes, thereby conserving computing resources that would be used for such an attempted analysis.

It is also noted that, in many implementations, the source code used for IaC development may be hosted on a source code management (SCM) system, but that these SCM systems may not have access to source code of leaf modules. Accordingly, by crawling through dependencies up to the leaf modules including the module which depends from each leaf module, all data needed for determining source code identifiers can be obtained without requiring access to the leaf modules themselves.

At S370, an enrichment database is created based on the configuration mapping files and source code of dependencies and execution may continue with S310 (for example, at the next periodic interval). In an embodiment, S370 includes creating a new enrichment database or updating an existing enrichment database.

In an embodiment, the enrichment database includes locations and times of deployment of respective resource components, unique identifiers for resources whose definitions are included in those resource components, source identifiers of a root resource component depending on each resource component, a source identifier for the resource component, combinations thereof, and the like. The database may therefore be utilized to determine the deployment which modified a resource represented in an alert at a relevant time frame (e.g., a time frame including a time of the alert).

An identifier uniquely identifies a resource or resource component when only that identifier corresponds to the resource or resource component. That is, an identifier is said to uniquely identify a resource or resource component when that identifier and no other identifier corresponds to (and therefore identifies) the resource or resource component.

In this regard, it is noted that the dependencies as indicated in the configuration mapping file for a resource component are not necessarily expressed using unique identifiers of resources in the resource component such that the dependencies of resource components may not be identified with respect to these unique identifiers. By associating unique identifiers of resources included in a given resource component with combinations of characteristics representing the resource component in the form of source identifiers, the enrichment database can be subsequently queried using a unique identifier indicated in an alert to identify the relationship between the alert and the configuration mapping file of a resource component indicating the affected resource indicated in the alert. Thus, using these associations between unique identifiers and source identifiers for alert enrichment allows for providing additional contextual information related to deployment of the resource indicated in the alert, which in turn allows for providing more accurate information related to the alert or otherwise more accurately determining which remediation actions should be performed in order to mitigate a potential cyber threat which triggered the alert.

It is also noted that, by using timestamps to determine a deployment at a relevant time frame along with a location of the deployment, remediation of an alert can be performed even after the applicable time frame has ended. It is further noted that alerts typically provide an indication of which resources were involved as well as a time at which the alert was triggered; based on the involved resources and this time, the last software development pipeline run that modified the resource can be accurately identified, which in turn allows for more accurately determining appropriate remediation actions to avoid or mitigate potential cyber threats that triggered the alert.

Returning to FIG. 2, at S220, one or more alerts are contextually enriched using the data stored in the enrichment database. In some implementations, the contextually enriched alerts may be stored in the enrichment database for subsequent reference. In an embodiment, the alerts are contextually enriched at least using the source identifier of any resource components represented in the alert (e.g., represented via a unique identifier of a resource whose definition is included in the resource component included in the alert).

Figure 4:
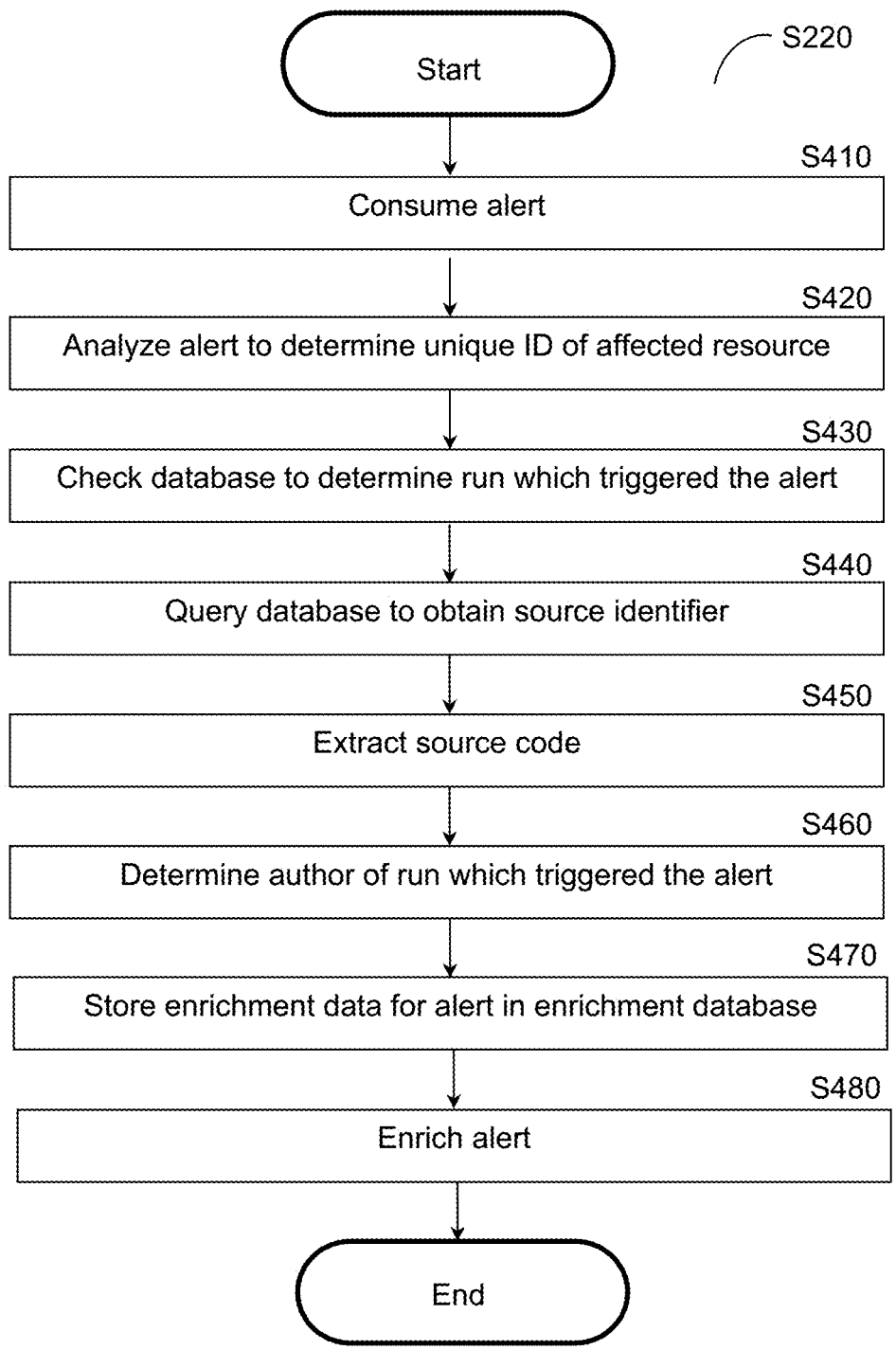
FIG. 4 is a flowchart illustrating a method for contextually enriching alerts according to an embodiment.

In an embodiment, the alerts are contextually enriched as now described with respect to FIG. 4. FIG. 4 is an example flowchart S220 illustrating a method for contextually enriching alerts according to an embodiment.

At S410, an alert is consumed. The alert may be consumed, for example, from a detection tool (e.g., one of the detection tools 112, FIG. 1). Alternatively, the alert may be retrieved from a database (e.g., the IaC database 117, FIG. 1). The consumed alert relates to a set of events and includes a unique identifier (e.g., a GUID) of a computing infrastructure resource which is affected by those events.

At S420, the consumed alert is analyzed in order to determine a unique identifier of an affected resource. The unique identifier is a value which is assigned to and uniquely identifies the affected resource and may be, but is not limited to, a numerical value, a textual value (e.g., a name), a combination thereof, and the like. In an example implementation, the unique identifier is a globally unique identifier (GUID). In an embodiment, S420 includes parsing the alert to identify a unique identifier indicated in the alert.

At S430, an enrichment database is checked in order to determine a run which triggered the alert. More specifically, S430 includes comparing a time (e.g., as indicated by a timestamp) of the alert to respective times of pipelines modified by the affected resource. To this end, the enrichment database stores data about pipelines and pipeline runs including timestamps of pipeline runs for pipelines which may be modified by deployment of computing infrastructure resources.

At S440, the database is queried in order to obtain a source identifier of a resource component including the definition of the affected resource. The enrichment database stores data including source identifiers of resource components and unique identifiers of resources defined in those resource components, for example data determined as described above with respect to FIG. 3.

The source identifiers are combinations of characteristics of respective resource components, where each combination of characteristics making up a source identifier collectively identifies a respective resource component such that each source identifier uniquely identifies its respective resource component. In other words, each source identifier is a combination of characteristics of a resource component that collectively (i.e., taken together) serve to uniquely identify the resource component such that only one source identifier corresponds to a given resource component. To this end, S440 may further include identifying the source identifier of a resource component including the affected resource by querying the database using the unique identifier of the affected resource indicated in the alert.

At S450, source code of the resource component including the affected resource is extracted based on the obtained source identifier. In a further embodiment, a specific portion (e.g., a specific block) of the source code defining the affected resource is extracted instead of the whole source code including the definition of the affected resource.

At S460, an author of the resource definition applied in the software development pipeline run which triggered the alert is determined. In an embodiment S460 includes analyzing a software development pipeline log of the run which triggered the alert to determine the author of the relevant revision of the extracted source code or portion thereof (i.e., the revision of the source code or portion thereof used during the run which triggered the alert.

At optional S470, enrichment data for the alert discovered during one or more of the foregoing steps is stored in an enrichment database for subsequent use.

At S480, the alert is enriched using at least a portion of the enrichment data for the alert. The enriched alert at least includes the source identifier of the resource component represented in the alert which, as noted above, is a combination of characteristics of the resource component including the affected resource indicated in the alert which provide information uniquely identifying the resource component. Accordingly, an alert enriched with a source identifier of a resource component provides additional contextual information about the resource affected by the events of the alert and, in particular, contextual information related to deployment of the resource defined by a definition within the resource component. The enriched alert may further provide additional contextual information which can be utilized to improve remediation of the alert, i.e., by more accurately selecting remediation actions or otherwise providing more data useful for remediating the alert, thereby avoiding or further mitigating any potential cyber threats which triggered the alert.

Further, in accordance with various embodiments, the alert is enriched using both data determined using source code (which are created by authors/engineers) as well as using configuration mapping files (which are not created by authors/engineers). As noted above, the author of the run which triggered the alert is determined by extracting the source code. Further, dependencies used to associate unique identifiers of resources with respective source identifiers of resource components including those resources are determined using configuration mapping files. By utilizing data derived using both source code and configuration mapping files to enrich alerts, the enriched alerts are contextually enhanced in order to allow for improving remediation of the alerts.

It should be noted that FIG. 4 is described with respect to an alert indicating a single affected resource component merely for simplicity, but that the alert enrichment described with respect to FIG. 4 may be performed for an alert indicating multiple affected resource components without departing from the scope of the disclosure. To this end, the process of FIG. 4 may be performed iteratively, the iterations being sequential or in parallel, where the alert is enriched with respect to one of the resource components during any given iteration.

Returning to FIG. 2, at S230, the contextually enriched alerts are remediated. The remedial actions may include, but are not limited to, altering or preventing deployment of the resource components, severing connections between resource components, changing the source code, generating notifications (e.g., a notification including the enriched alert), combinations thereof, and the like.

As noted above, an author of the run or the resource component which triggered the alert may be identified, for example as part of alert enrichment. In some embodiments, notifications generated may further be sent to an account associated with such an author in order to send the notification to an appropriate person for addressing the enriched alert.

Figure 5:
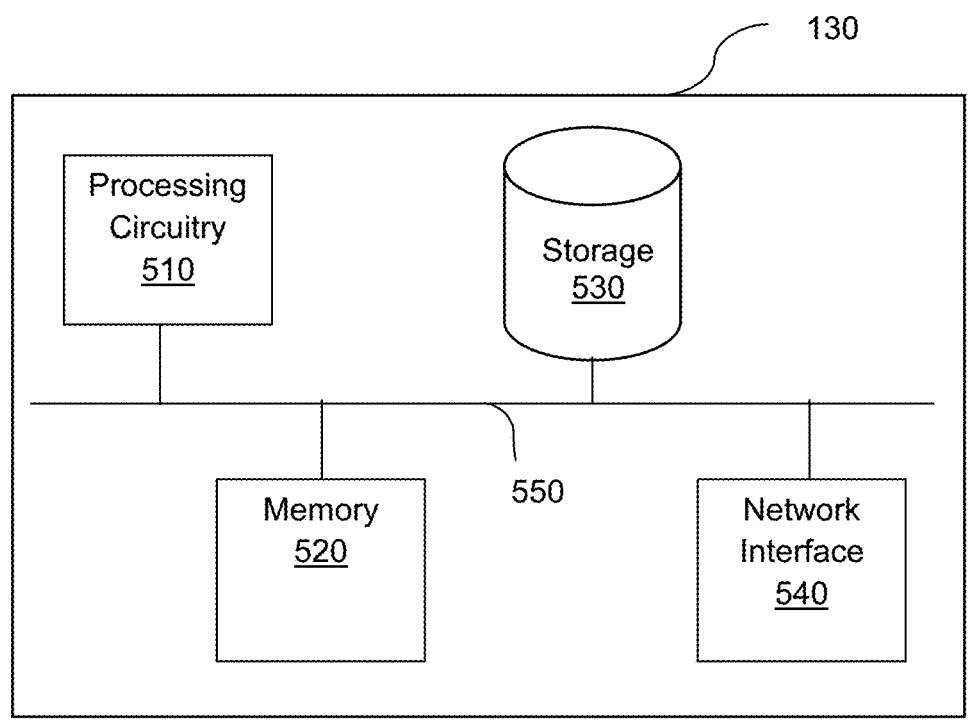
FIG. 5 is a schematic diagram of an alert remediator according to an embodiment.

FIG. 5 is an example schematic diagram of an alert manager 130 according to an embodiment. The alert manager 130 includes a processing circuitry 510 coupled to a memory 520, a storage 530, and a network interface 540. In an embodiment, the components of the alert manager 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the alert manager 130 to communicate with, for example, the enrichment database 120, the detection tools 112, the IaC database 117, and the like.

It should be understood that the embodiments described herein are not limited to the specific architecture illustrated in FIG. 5, and other architectures may be equally used without departing from the scope of the disclosed embodiments.

It should be noted that various embodiments described herein are discussed with respect to enriching and remediating alerts, but that the disclosure is not necessarily limited to such implementations. The techniques described herein can be utilized to enrich other kinds of data which identify resources or resource components, and the enriched data may be utilized for purposes other than remediation of alerts in accordance with at least some disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for remediation, comprising:
   identifying a plurality of steps in at least one software development pipeline log, wherein each of the identified plurality of steps is a step in which a first resource component among a plurality of first resource components is deployed;
   analyzing the at least one software development pipeline log with respect to the identified plurality of steps in order to determine a location and a time of deployment for each first resource component of the plurality of first resource components;
   retrieving source code of a revision of a root resource component for each first resource component of the plurality of first resource components based on the determined location and time of deployment for the first resource component, wherein the revision of the root resource component for each first resource component was used during a latest pipeline run which had occurred as of a time of deployment of the first resource component;
   creating an enrichment database by analyzing the source code of each root resource component in order to identify a plurality of dependencies of each root resource component, wherein the enrichment database includes associations between source identifiers of the plurality of first resource components and unique identifiers of a plurality of resources indicated in a plurality of respective resource definitions in the plurality of first resource components;
   determining a source identifier of a second resource component including a computing infrastructure resource by querying the enrichment database using the unique identifier of the computing infrastructure resource, wherein the second resource component is indicated in an alert; and
   performing at least one remediation action with respect to the alert based on the source identifier of the second resource component.

2. The method of claim 1, wherein the second resource component includes at least one source file, wherein the source identifier of the second resource component is a combination of characteristics of the second resource component which collectively uniquely identify the second resource component with respect to the directory in which the at least one source file of the second resource component reside.

3. The method of claim 1, further comprising:
   contextually enriching the alert indicating the second resource component by adding the source identifier of the second resource component to the alert in order to create a contextually enriched alert.

4. The method of claim 3, wherein the at least one remediation action is performed based on the contextually enriched alert.

5. The method of claim 3, further comprising:
   determining a software development pipeline run which triggered the alert; and
   determining an author of the software development pipeline run which triggered the alert, wherein the alert is contextually enriched based further on the determined author, wherein the determined author is an author of the revision of the root resource component for which the source code is retrieved.

6. The method of claim 1, wherein the combination of characteristics of the source identifier of the second resource component includes a repository in which at least one source file of the second resource component reside, a revision of the repository, and a path to the directory of the second resource component.

7. The method of claim 4, wherein creating the enrichment database further comprises:
   recursively crawling through source code of the root resource component and at least one dependency of the root resource component, wherein the source identifiers of the plurality of resource components are determined based on the recursive crawling.

8. The method of claim 7, wherein the recursive crawling is performed up to at least one leaf resource component among the plurality of first resource components, wherein each leaf resource component is a resource component from which another resource component depends, wherein each leaf resource component does not depend from another resource component.

9. The method of claim 4, wherein the enrichment database is created based on a configuration mapping file of at least one root resource component and based on source code of the at least one root resource component.

10. A non-transitory computer readable medium having stored thereon instructions for causing a processing circuitry to execute a process, the process comprising:
    identifying a plurality of steps in at least one software development pipeline log, wherein each of the identified plurality of steps is a step in which a first resource component among a plurality of first resource components is deployed;
    analyzing the at least one software development pipeline log with respect to the identified plurality of steps in order to determine a location and a time of deployment for each first resource component of the plurality of first resource components;
    retrieving source code of a revision of a root resource component for each first resource component of the plurality of first resource components based on the determined location and time of deployment for the first resource component, wherein the revision of the root resource component for each first resource component was used during a latest pipeline run which had occurred as of a time of deployment of the first resource component;

creating an enrichment database by analyzing the source code of each root resource component in order to identify a plurality of dependencies of each root resource component, wherein the enrichment database includes associations between source identifiers of the plurality of first resource components and unique identifiers of a plurality of resources indicated in a plurality of respective resource definitions in the plurality of first resource components;

determining a source identifier of a second resource component including a computing infrastructure resource by querying the enrichment database using the unique identifier of the computing infrastructure resource, wherein the second resource component is indicated in an alert; and performing at least one remediation action with respect to the alert based on the source identifier of the second resource component.

11. A system for remediation, comprising:

a processing circuitry; and a memory, the memory containing instructions that, when executed by the processing circuitry, configure the system to:

identify a plurality of steps in at least one software development pipeline log, wherein each of the identified plurality of steps is a step in which a first resource component among a plurality of first resource components is deployed;

analyze the at least one software development pipeline log with respect to the identified plurality of steps in order to determine a location and a time of deployment for each first resource component of the plurality of first resource components;

retrieving source code of a revision of a root resource component for each first resource component of the plurality of first resource components based on the determined location and time of deployment for the first resource component, wherein the revision of the root resource component for each first resource component was used during a latest pipeline run which had occurred as of a time of deployment of the first resource component;

create an enrichment database by analyzing the source code of each root resource component in order to identify a plurality of dependencies of each root resource component, wherein the enrichment database includes associations between source identifiers of the plurality of first resource components and unique identifiers of a plurality of resources indicated in a plurality of respective resource definitions in the plurality of first resource components;

determine a source identifier of a second resource component including a computing infrastructure resource by querying the enrichment database using the unique identifier of the computing infrastructure resource, wherein the second resource component is indicated in an alert; and perform at least one remediation action with respect to the alert based on the source identifier of the second resource component.

12. The system of claim 11, wherein the second resource component includes at least one source file, wherein the source identifier of the second resource component is a combination of characteristics of the second resource component which collectively uniquely identify the second resource component with respect to the directory in which the at least one source file of the second resource component reside.

13. The system of claim 11, wherein the system is further configured to:

contextually enrich the alert indicating the second resource component by adding the source identifier of the second resource component to the alert in order to create a contextually enriched alert.

14. The system of claim 13, wherein the at least one remediation action is performed based on the contextually enriched alert.

15. The system of claim 13, wherein the system is further configured to:

determine a software development pipeline run which triggered the alert; and determining an author of the software development pipeline run which triggered the alert, wherein the alert is contextually enriched based further on the determined author, wherein the determined author is an author of the revision of the root resource component for which the source code is retrieved.

16. The system of claim 11, wherein the combination of characteristics of the source identifier of the second resource component includes a repository in which at least one source file of the second resource component reside, a revision of the repository, and a path to the directory of the second resource component.

17. The system of claim 14, wherein the system is further configured to:

recursively crawl through source code of the root resource component and at least one dependency of the root resource component, wherein the source identifiers of the plurality of resource components are determined based on the recursive crawling.

18. The system of claim 17, wherein the recursive crawling is performed up to at least one leaf resource component among the plurality of first resource components, wherein each leaf resource component is a resource component from which another resource component depends, wherein each leaf resource component does not depend from another resource component.

19. The system of claim 14, wherein the enrichment database is created based on a configuration mapping file of at least one root resource component and based on source code of the at least one root resource component.

* * * * *